US 8,736,683 B2

(12) United States Patent
Cao et al.

(10) Patent No.: US 8,736,683 B2
(45) Date of Patent: May 27, 2014

(54) METHOD FOR ESTIMATING A DEFECT IN AN IMAGE-CAPTURING SYSTEM, AND ASSOCIATED SYSTEMS

(75) Inventors: Frederic Cao, Boulogne-Billancourt (FR); Frederic Guichard, Paris (FR); Ayham Nseir, Paris (FR)

(73) Assignee: DxO Labs, Boulogne-Billancourt (FR)

( * ) Notice: Subject to any disclaimer, the term of this patent is extended or adjusted under 35 U.S.C. 154(b) by 180 days.

(21) Appl. No.: 13/386,036

(22) PCT Filed: Jul. 2, 2010

(86) PCT No.: PCT/FR2010/051395
§ 371 (c)(1),
(2), (4) Date: Jan. 20, 2012

(87) PCT Pub. No.: WO2011/010040
PCT Pub. Date: Jan. 27, 2011

(65) Prior Publication Data
US 2012/0120255 A1    May 17, 2012

(30) Foreign Application Priority Data
Jul. 21, 2009   (FR) ..................... 09 55075

(51) Int. Cl.
*H04N 17/00*       (2006.01)
(52) U.S. Cl.
USPC .......................................... 348/187; 348/188
(58) Field of Classification Search
USPC ......... 348/187, 188, 175, 143, 135, 137, 241, 348/246; 382/190, 192, 209, 275
See application file for complete search history.

(56) References Cited

U.S. PATENT DOCUMENTS 4,991,007 A * 2/1991 Corley .................. 348/188
6,980,231 B1 * 12/2005 Ohsawa ................ 348/188
(Continued)

FOREIGN PATENT DOCUMENTS

WO   WO 03007236 A2   1/2003
WO   WO 03007237 A1   1/2003
(Continued)

OTHER PUBLICATIONS

Kim, et al., "Robust Radiometric Calibratio and Vignetting Correction," *IEEE Transactions on Pattern Analysis and Machine Intelligence*, IEEE Service Center, 30(4):562-576 (2008).

(Continued)

*Primary Examiner* — Victor Kostak
(74) *Attorney, Agent, or Firm* — Kilpatrick Townsend & Stockton LLP; Renae Bailey Wainwright, Esq.; Dean W. Russell, Esq.

(57) ABSTRACT

The invention relates to a method for estimating a defect in an image-capturing system (I), which produces, with regard to any first image (I), representing any scene (S), a variation in the field of a characteristic of the first image, having an order of magnitude that is statistically lower than a variation in the field of said characteristic added by the scene. The method comprises: calculating, in at least a first portion of the field of the first image, a measurement ($\mu(I)$) related to said characteristic of the first image, an estimative magnitude (v) of said defect, depending on the calculated measurement and having a variation having the same order of magnitude as the variation in the field of said characteristic of the first image produced by said defect.

15 Claims, 3 Drawing Sheets

(56) References Cited

U.S. PATENT DOCUMENTS

| | | | |
|---|---|---|---|
| 7,068,302 B2* | 6/2006 | Ebenstein et al. | 348/187 |
| 7,190,401 B2* | 3/2007 | Hara et al. | 348/333.02 |
| 7,304,663 B2* | 12/2007 | Albertelli | 348/188 |
| 7,629,998 B2* | 12/2009 | Elberbaum | 348/187 |
| 7,732,768 B1* | 6/2010 | Haigh et al. | 250/332 |
| 7,839,422 B2* | 11/2010 | Agarwala | 345/629 |
| 8,094,195 B2* | 1/2012 | Butterworth | 348/187 |
| 8,320,663 B2* | 11/2012 | Bodnar et al. | 382/162 |
| 2004/0041919 A1* | 3/2004 | Yamanaka | 348/222.1 |
| 2007/0146506 A1 | 6/2007 | Lin et al. | |
| 2008/0055455 A1* | 3/2008 | Ovsiannikov | 348/335 |
| 2009/0060369 A1* | 3/2009 | Agarwala et al. | 382/261 |

FOREIGN PATENT DOCUMENTS

| | | |
|---|---|---|
| WO | WO 03007239 A1 | 1/2003 |
| WO | WO 03007241 A1 | 1/2003 |
| WO | WO 03007242 A2 | 1/2003 |
| WO | WO 2009029365 A1 | 3/2009 |

OTHER PUBLICATIONS

Zheng, et al., "Single-Image Vignetting Correction," *Computer Vision and Pattern Recognition*, 2006 IEEE Computer Society Conference, New York, New York, 1:461-468 (2006).

Zheng, et al., "Single-Image Vignetting Correction Using Radial Gradient Symmetry," *Computer Vision and Pattern Recognition*, CVPR 2008, IEEE Conference, Piscataway, New Jersey, pp. 1-8 (2008).

International Search Report dated Nov. 8, 2010 in Application No. PCT/FR2010/051395.

Search Report dated Mar. 9, 2010 in Application No. FR0955075.

\* cited by examiner

METHOD FOR ESTIMATING A DEFECT IN AN IMAGE-CAPTURING SYSTEM, AND ASSOCIATED SYSTEMS

CROSS-REFERENCE TO RELATED APPLICATIONS

This application is the U.S. national phase of International Application No. PCT/FR2010/051395 filed on Jul. 2, 2010, which application claims priority to French Patent Application No. 0955075 filed on Jul. 21, 2009, the contents of both of which are incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The invention relates to defects in image-capturing systems.

An image-capturing system (fixed or animated) can, for example, be a module for use in a digital camera, a reflex camera, a scanner, a fax, an endoscope, a movie camera, a camcorder, a surveillance camera, a toy, a movie camera, a camera integrated with or connected to a telephone, personal digital assistant or computer, an infrared camera, an ultrasound device, a MRI (magnetic resonance imaging) device, an X-ray radiography device, etc.

It conventionally comprises a sensor and an optical system comprising one or more lenses for focusing the light on the sensor.

The optical system is characterized by a number of characteristics, including the dimensions, number of lenses, the materials used for the lenses, the shape of the lenses, the position of the different component elements of the system along an optical axis, etc.

As for the sensor, it is a system of photosensitive elements (pixels for example) which converts an amount of light received into digital values, and which assigns to each pixel the corresponding value or values. The unprocessed image directly captured by the sensor is traditionally called the raw image. The number of numerical values ultimately attributed to each pixel depends on the image-capturing system.

The sensor can, for example, be a CCD (Charge Coupled Device), a CMOS (Complementary Metal Oxide Semiconductor), a CID (Charge Induced Device), an IRCCD (Infrared CCD), an ICCD (Intensified CCD), an EBCCD (Electron Bombarded CCD), an MIS (Metal Insulator Semiconductor), an APS (Active Pixel Sensor), a QWIP (Quantum Well Infrared Photodetector), an MQW (Multiple Quantum Well), or other device. It may possibly be associated with a filter, such as a Bayer filter or panchromatic cells for example, in order to obtain a color image.

An image-capturing system is meant to produce a faithful image of the photographed scene. In particular, an image-capturing system must be able to translate the variations within the field of the properties of objects in the photographed scene, such as their albedo (how they reflect light), their distance to the camera, or other properties.

However, an actual image-capturing system generally has defects, such as those related to its design or manufacture, which produce variations in the field of the captured image. As a result, the variations present in the captured image are not only related to the properties of the photographed scene, but also arise from one or more defects in the image-capturing system. This can cause annoyance when such an image is viewed by the human eye.

There can be numerous different types of defects in an image-capturing system, producing a variation in at least one characteristic of an image within the field of the image captured with the image-capturing system.

One example is luminance vignetting. This causes the image captured by the image-capturing system to be darker at the edges than at the center. The luminance vignetting defect produces a variation, within the field of an image captured with the image-capturing system, of at least one characteristic corresponding to the grayscale. This defect produces a variation which is statistically an order of magnitude lower than the grayscale variation produced by the lighting and the reflectance of the objects in the scene.

Another example of a defect in an image-capturing system is colored vignetting. This defect produces a variation, within the field of an image captured with the image-capturing system, of at least one characteristic corresponding to the colorimetry. This defect produces a variation which is statistically an order of magnitude lower than the colorimetry variation produced by the color of the objects in the scene. It corresponds to a variation in the spectral responses of the image-capturing system (sensor+infrared filter) as a function of the position in the field. As a result, a completely uniform surface lit with a single light source does not result in a homogeneous response on the sensor in terms of color. The variations depend on the spectral distribution of the light source, which is unpredictable from the one image alone, as well as the angle of incidence at which each photosensitive element of the sensor receives light. This problem arises for any sensor containing different types of photosensitive elements, such as sensors using a Bayer array which repeats a pattern of four pixels (two green, one red, one blue), as well as other types of arrays.

Another example of a defect in an image-capturing system is non-uniform blur. This defect produces a variation, within the field of an image captured with the image-capturing system, of at least one characteristic corresponding to the blur. This defect produces a variation which is statistically an order of magnitude lower than the variation in sharpness produced by the objects in the scene. This defect is particularly related to the curvature of field. In fact, as the position of best focus is generally not flat but curved, a blur variation results along this curve when using a planar sensor.

The curve is also dependent on the wavelength, so that the blur variation changes depending on the color being observed. This defect is known as chromatic aberration.

One will note that non-uniform blur can also be linked to other factors, such as a lack of uniformity in the sharpness due to the manufacturing quality of the lens.

In the case where the optical system used is autofocusing, the blur in the captured image can also be influenced by the mobility of the lens or lenses relative to the sensor or to each other. This mobility of the lenses is not always completely controlled and the lenses may sometimes be angled (off-center, optical tilt, etc.), which implies that their optical axes change. These relative movements change the optical properties in the field. For example, as a first approximation, this means changes in the distance of the objects in the field and therefore their sharpness in the image. These movements are random and because of their nature are unpredictable.

Another example of a defect in an image-capturing system comprising a sensor using a Bayer filter arises from the fact that the two green pixels (Gr and Gb) in the same cell of the array can be significantly different, and this difference can vary within the field. This defect produces a variation, within the field of an image captured with the image-capturing system, of at least one characteristic corresponding to the structure of the noise. This defect produces a variation which is statistically an order of magnitude lower than the structure variation produced by the objects in the scene.

The above list of defects is not exhaustive. As will be apparent to a person skilled in the art, one can envisage other defects in an image-capturing system which produce a variation, within the field of an image captured with the image-capturing system, of at least one characteristic.

For example, there are: the non-uniform noise defect, producing a variation in the noise level in the image which is statistically an order of magnitude lower than the variation in fine details of objects in the scene; the defects in geometry such as distortion or chromatic aberration, producing a variation in the local deformation of the image which is statistically an order of magnitude lower than the variation in the geometry of the objects in the scene; non-uniform black level defects, producing a black level variation in the image which is statistically an order of magnitude lower than the black level variation of the objects in the scene; the flare defect, producing a contrast variation an order of magnitude lower than the contrast variation due to the scene; non-uniform optical defects in the field, producing a variation in at least one characteristic in the image; non-uniform sensor defects in the field, producing a variation of at least one characteristic in the image.

Some of these defects presented by an image-capturing system cause variations in the captured image which are independent of the image capture conditions and parameters. Others, however, produce a variation within the field of at least one characteristic of the captured image, dependent on at least one image capture condition and/or at least one image capture parameter of the image. The colored vignetting and non-uniform blur mentioned above are examples of defects of this second type.

Some or all of the following elements constitute an image capture condition: the distance of the objects (or distance between the scene and the camera), the scene composition, the characteristics of the light source or sources (such as spectral response, mean temperature, tint, light intensity, position of light sources, etc.), the content of the scene (position of objects in the scene, average color, etc.), the temperature, the geographical position (particularly for cameras having a locational system such as GPS (Global Positioning System) or some other system), and/or the time of day, etc.

Some or all of the following elements constitute an image capture parameter: the type of lens used when the lens is interchangeable, the model of the capture system used, the focal length, the focus distance, overexposure or underexposure, activation of the flash and its intensity, exposure time, sensor amplification, compression, white balance, etc.

Defects leading to variations within the field which are independent of the image capture parameters and conditions are traditionally corrected by a phase of measuring and determining correction parameters, called calibration. This calibration is generally conducted in the laboratory, when the image-capturing system exits the production line. It uses a reference image representing a predetermined scene, such as a test pattern for example.

During the calibration, at least one image is captured of a predetermined scene and one or more fixed sets of correction parameters are derived from this. For example, WO 03/007241, WO 03/007237, and WO 03/007242 describe such a method.

The calibration is therefore an additional phase in the manufacturing of image-capturing systems, requiring some amount of time which impacts production speeds. It also requires permanently storing the correction parameters obtained from the calibration.

These phenomena are aggravated when one wants to correct defects which vary from one image-capturing system to another, due for example to their nature and/or to production tolerances. Calibration by unit and not by module (meaning by type of image-capturing system) is necessary in this case. For example, the calibration must be done for each unit on the production line when there is a defect which is dependent on at least one uncertainty in the manufacture of the image-capturing system.

The following are non-limiting examples of defects which are dependent on an uncertainty in the manufacture of the image-capturing system:
- the defect of colorimetry variation in the field, which is dependent in particular on the following uncertainty in the manufacture of the image-capturing system: the shape and position of the optical elements relative to each other and to the sensor,
- the defect of luminance variation in the field, which is dependant in particular on the following uncertainty in the manufacture of the image-capturing system: the shape and position of the optical elements relative to each other and to the sensor,
- the defect of sharpness variation in the field, which is dependant in particular on the following uncertainty in the manufacture of the image-capturing system: the shape and position of the optical elements relative to each other and to the sensor.

As for defects having a dependency on some image capture conditions and/or some image capture parameters, the situation is even more delicate.

The above calibration of image-capturing systems only obtains correction parameters directly linked to the specific image capture conditions and parameters in effect during the calibration phase. During later use of the calibrated image-capturing system, these correction parameters are no longer suitable for correcting the presence of these defects in images captured under other conditions and/or parameters. Using these same correction parameters independently of the image capture conditions and parameters would result in obtaining poor quality images.

For defects which vary according to at least one image capture condition measurable by the image-capturing system, such as the temperature of the light source for example, it is known to perform a calibration for several image capture conditions, with the correction parameters being dependent on variable image capture conditions. For example, WO 03/007236 and WO 03/007239 describe such a method.

The same is true for defects which vary according to at least one image capture parameter, such as the focal length. The calibration is then done for several image capture parameters, with the correction parameters dependant on variable image capture parameters. For example, WO 03/007236 and WO 03/007239 describe such a method.

For defects which vary according to at least one image capture condition and/or image capture parameter not measurable by the image-capturing system, such as the spectral response of the light source for example, a method based on calibration simply does not work.

Therefore either the defects which are dependent on at least one image capture condition and/or image capture parameter can be the subject of a calibration, although this is complex and only obtains correction parameters poorly suited for image capture conditions and/or image capture parameters not specified during the calibration; or they cannot be the subject of a calibration and therefore cannot be corrected.

One should also note that there are estimation methods based on an image, such as white balance estimation for example, but these do not concern a defect of the image-capturing system but rather an image capture parameter estimated from the image.

DESCRIPTION OF RELATED ART INCLUDING INFORMATION DISCLOSED UNDER 37 CFR 1.97 AND 1.98

Not Applicable

BRIEF SUMMARY OF THE INVENTION

One purpose of the invention is to overcome at least some of the above disadvantages.

The invention therefore proposes a method for estimating at least one defect of an image-capturing system, said defect producing, for any at least one first image captured by the image-capturing system and representing any scene, a variation within the field of at least one characteristic of the first image, said variation being statistically an order of magnitude lower than a variation within the field of said characteristic of the first image introduced by the scene. This method comprises the following steps:
  calculating, in at least a first portion of the field of the first image, a measurement relative to said characteristic of the first image; and
  obtaining, in at least a second portion of the field of the first image, an estimated magnitude of said defect, said magnitude being dependent on the calculated measurement and having a variation of the same order of magnitude as the variation within the field of said characteristic of the first image produced by said defect.

By estimating the defect of the image-capturing system in this manner, the need for a calibration as described above is eliminated as are the associated disadvantages (cost of implementation, use of a test pattern, storing data in permanent memory, etc.). In addition, defects not correctable by calibration can be estimated.

This estimation of the defect can be used for different purposes and/or by different parties. For example, it can be used in image-capturing system qualification, for performing a correction of the defect, or for other uses.

The following are some advantageous embodiments which can be combined in any conceivable manner:
  the method additionally comprises a determination, from the obtained magnitude, of at least one correction parameter of said defect for at least one second image captured by the image-capturing system, said second image being different from or the same as the first image. The ability to correct a second image or possibly a plurality of second images, which may be different from the first image used for the estimation of the defect, saves processing;
  said correction parameter is determined for the entire field of the second image;
  the method additionally comprises a processing of the second image, captured by the image-capturing system, which takes into account said correction parameter;
  the first image has a lower resolution, number of channels, and/or number of dimensions than the second image;
  the variation within the field of at least one characteristic of the first image produced by said defect is dependent on at least one image capture parameter and/or image capture condition of the first image, and the second image is captured by the image-capturing system with said image capture parameter and/or image capture condition being identical or similar to the first image. One can thus estimate this type of defect which, in the prior art, could not be appropriately corrected after calibration or could not be calibrated at all;
  the variation within the field of at least one characteristic of the first image produced by said defect is specific to said image-capturing system. In this case, costly per-unit calibration is avoided;
  the defect depends on at least one uncertainty in the manufacture of said image-capturing system;
  the image-capturing system comprises at least one of the following: luminance vignetting, colored vignetting, non-uniform blur, non-uniform variation of a ratio between neighboring photosensitive elements in the same channel, non-uniform noise, geometric distortion, lateral chromatic aberration, longitudinal chromatic aberration, astigmatism, flare, and non-uniform black level;
  the method comprises an identification, in said at least first portion of the field of the first image, of a set of homogeneous zones within each of which said calculated measurement varies by the same order of magnitude as the variation within the field of said characteristic of the first image produced by said defect, and said magnitude is obtained by taking into account the identified homogeneous zones;
  said magnitude is obtained, inside a homogeneous zone of said set of homogeneous zones, by relating said calculated measurement to a measurement concerning said characteristic of the first image and calculated at a reference point of said homogeneous zone.

The invention also proposes a system for estimating at least one defect of an image-capturing system according to the above method, said defect producing, for at least any one first image captured by the image-capturing system and representing any scene, a variation within the field of at least one characteristic of the first image, said variation being statistically an order of magnitude lower than a variation within the field of said characteristic of the first image introduced by the scene. This system comprises:
  a unit for calculating, in at least one first portion of the field of the first image, a measurement concerning said characteristic of the first image;
  a unit for obtaining, in at least one second portion of the field of the first image, an estimated magnitude for said defect, said magnitude being dependent on the calculated measurement and having a variation of the same order of magnitude as the variation within the field of said characteristic of the first image produced by said defect.

The invention also proposes a system for determining at least one parameter for correcting at least one defect of an image-capturing system estimated according to the above method. This system comprises a unit for determining, from the obtained magnitude, at least one correction parameter of said defect for at least one second image captured by the image-capturing system, the second image being different from or the same as the first image.

The invention further proposes a computer program product and/or an electronic circuit comprising code instructions for implementing the above method for estimating at least one defect of an image-capturing system.

BRIEF DESCRIPTION OF THE SEVERAL VIEWS OF THE DRAWINGS

Other features and advantages of the invention will become apparent on reading the following description of some non-limiting examples, with reference to the attached drawings in which.

DETAILED DESCRIPTION OF THE INVENTION

Figure 1:
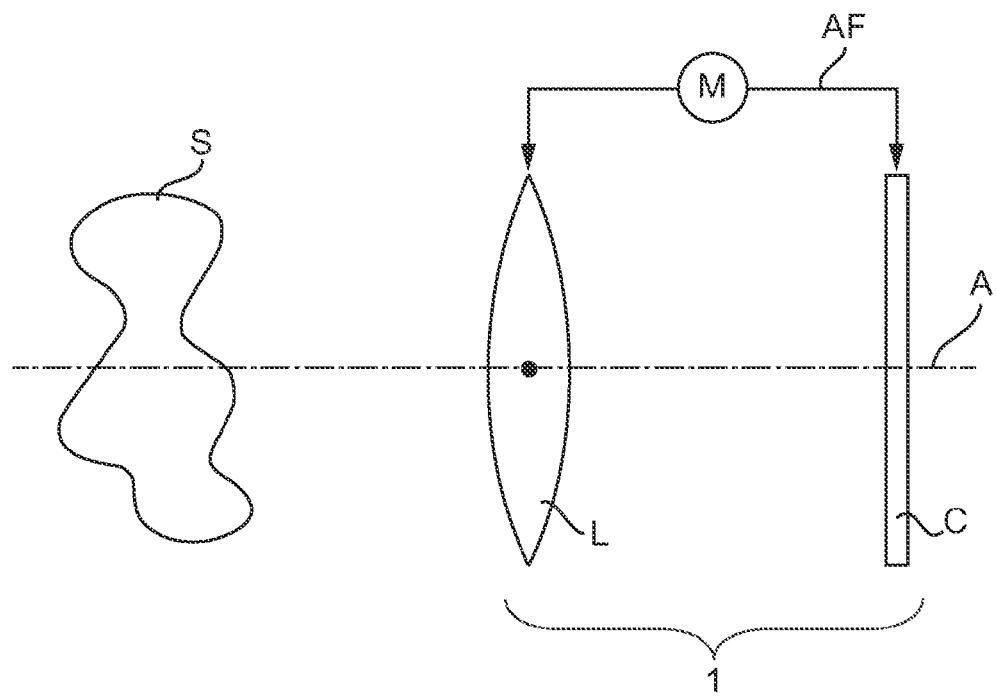
FIG. 1 is a diagram showing an example of an image-capturing system in which the invention can be used.

FIG. 1 shows an example of an image-capturing system 1. This conventionally comprises a sensor C and an optical system including at least one lens L, which can be of any conceivable form as explained in the introduction.

Optionally, the image-capturing system 1 can comprise an autofocus system AF which ensures the relative displacement between the optical system L and the sensor C, for example by means of a motor M. This displacement is advantageously translational along the optical axis A of the image-capturing system, although other movements can also be considered, such as along axes perpendicular to the optical axis in order to obtain an image stabilization effect.

When the optical system L comprises a plurality of lenses, only a portion of them may be subject to a displacement relative to the sensor C. A relative displacement between lenses of the optical system L is also possible.

Optionally, the image-capturing system 1 can comprise an optical zoom to enable a change of scale.

The image-capturing system 1 is able to capture any at least one image I representing any scene S. "Any image representing any scene" is understood to mean an image which is not captured under specific predetermined conditions, and in which the content is not known in advance. Typically, this is an image captured during the service life of the image-capturing system 1 with no particular constraints. In contrast, a reference image, such as a test pattern, captured in the laboratory does not fall within this definition.

The captured image I can comprise a single value per pixel corresponding to a single channel, particularly if it is a RAW image. Alternatively, the image I can have several values per pixel, for example three values corresponding to the three channels red, green and blue (R,G,B). Other possibilities are also conceivable, as will be apparent to a person skilled in the art. The image I can be still or moving (video).

It is assumed that the image-capturing system 1 has a number of defects. This or these defects produce a variation within the field of at least one characteristic of this image I. In other words, a characteristic of the image I assumes values which are dependent on the position in the field.

As a non-limiting example, the image-capturing system 1 can have the luminance vignetting defect mentioned in the introduction. This defect produces, in the image I, a luminance variation in the field.

Additionally or alternatively, the image-capturing system 1 can have the colored vignetting defect mentioned in the introduction. This defect produces, in a colored image I, a colorimetry variation in the field.

Additionally or alternatively, the image-capturing system 1 can have the non-uniform blur defect related to curvature of field. This defect produces, in the image I, a blur variation in the field.

Additionally or alternatively, the image-capturing system 1 using an autofocus AF, as illustrated in FIG. 1, can have a blur defect related to the mobility of the lens or lenses L (off-centering, optical tilt, etc.). This defect produces, in the image I, a blur variation in the field.

Additionally or alternatively, the image-capturing system 1 comprising a sensor using a Bayer filter can have a defect such that two green pixels (denoted Gr and Gb) in the same cell of the array can be significantly different, and this difference can vary within the field.

Additionally or alternatively, the image-capturing system 1 can comprise any other defect producing, in the image I, a variation within the field of at least one characteristic of this image I.

For any defect presented by the image-capturing system 1, the resulting variation within the field of the relevant characteristic of the image I is statistically an order of magnitude lower than a variation within the field of this same characteristic introduced by the scene S.

The invention therefore applies in general to any defect which produces a variation in a characteristic of an image which is statistically an order of magnitude lower than a variation within the field of said image characteristic introduced by the scene, meaning that the defect introduces a variation in the field of a wavelength substantially higher than the wavelength of the variation within the field due to the scene. This eliminates scene dependency by eliminating the variations due to the scene, as will be described below.

This is understood to mean that, during displacement within the field of the image I, the variation produced by the defect is slower and more progressive than the variation introduced by the scene (which can produce abrupt transitions between two neighboring points in the image). In addition, even when considering the image I as a whole, the total amplitude of the variation produced by the defect is generally lower than that introduced by the scene (which can contain very high contrasts for example).

The fact that the variation produced by the defect is "statistically" an order of magnitude lower than that introduced by the scene S arises from considering a scene's mean variation. However, it is possible to have a particularly stable scene which has a particularly low variation. For example, this would be the case in a scene representing a flat monochromatic object that is uniformly lit. Given that we are interested in any scene S, this case is statistically unlikely. The variation produced by the defect is therefore generally an order of magnitude lower than that introduced by said any scene S.

This of course does not prevent the variation produced by the defect from being, in some places, of equal or greater order of magnitude than the variation introduced by said any scene S, particularly if said scene contains stable objects in some places. As will be explained below, this local stability within the scene S may be made use of in estimating the defect, by detecting corresponding homogeneous zones.

If said any photographed scene S happens to induce a variation of the same order of magnitude or even a lower order of magnitude than the defect of the image-capturing system 1, the following steps of the method can still be applied. An overcorrection or erroneous correction of the image may possibly result. For example, a gradation in the scene can be made uniform by the correction. However, the resulting loss of information may not be objectionable, or in any case may be less objectionable than if the defect of the image-capturing system 1 was left as is.

If considering color for example, one can assume that said any scene S contains objects of different colors, illuminated by lights of different spectra. The color of the scene may therefore vary fairly significantly in amplitude. It could possibly vary significantly between two points that are relatively close in the scene S, for example if the scene contains two neighboring objects of different colors.

Colored vignetting, however, is a phenomenon in which the amplitude depends primarily on the angle of incidence of the light received by the sensor. As a result of this phenomenon, the color varies relatively little and relatively slowly within the field. This color variation is indeed therefore an order of magnitude that is statistically lower than that introduced by the scene S itself.

Another factor of colored vignetting is that it is a phenomenon with spatial consistency. It is sufficient to estimate it at several locations within the field in order to deduce a good approximation everywhere.

As was discussed in the introduction, depending on the type of defect considered, the variation within the field of at least one characteristic of the image I produced by the defect in the image-capturing system 1 can depend on one or more image capture conditions and/or one or more image capture parameters of this image I, as defined above.

This is the case for colored vignetting, for example. As this phenomenon is dependent on the angle of incidence of the light received by the sensor, the resulting variation in color will not necessarily be the same for all lighting on the observed scene, even if the objects in the scene remain the same.

The same dependency on some image capture conditions and/or parameters, of the variation within the field of a characteristic of the image I, exists for other types of defects such as non-uniform blur for example.

In some cases, the variation within the field of at least one characteristic of the image I produced by the considered defect of the image-capturing system 1, could be specific to this image-capturing system. In other words, different units of the same model could have a different variation in this characteristic of the image I in relation to the considered defect.

This dependency on the image-capturing system can, for example, be caused by possibly variable characteristics of the image-capturing systems, for example due to manufacturing tolerances. As an example, a slight tilt in the optical system L relative to the sensor C of the image-capturing system 1 can cause a modification in the curvature of field and therefore in the non-uniform blur produced by this system.

Figure 2:
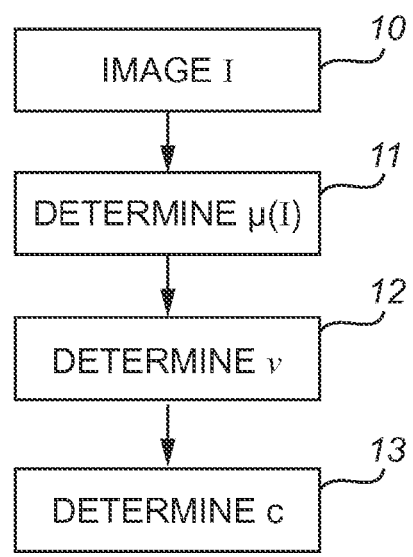
FIG. 2 is a flowchart showing a sequence of steps implemented according to the invention.

As is illustrated in FIG. 2, an image I captured by the image-capturing system 1 has at least one defect as described above (step 10).

In at least one portion of the field of this image I, a measurement $\mu(I)$ is calculated relative to the characteristic of the image I that the defect of the image-capturing system 1 causes to vary within the field (step 11). This measurement $\mu(I)$ has a value which also depends on the position in the field. This measurement is therefore local, and its value at each point is dependent on the image I within the area in proximity to the point considered.

The measurement $\mu(I)$ can be calculated at every point in the field of the image I, or at only given points in this field. As a non-limiting example, one can calculate the measurement $\mu(I)$ at only given points in the field, for which it was determined beforehand, for example by a measurement in the image, that the estimation will be reliable or more reliable than a given threshold.

This calculation is done on the fly, meaning on an image I captured during normal use of the image-capturing system 1, as opposed to calibration done in the laboratory after leaving the production line.

In addition, as described above, this calculation is done on any at least one image I representing any scene, as opposed to a reference image such as a test pattern for example.

It is possible for the measurement $\mu(I)$ to be calculated for several images I captured by the image-capturing system 1. For example, the different images I can be averaged and this average can be used to determine a measurement $\mu(I)$. Additionally or alternatively, a measurement $\mu(I)$ can be calculated for each of the images I independently, and the different measurements $\mu(I)$ are then averaged and only the one concerning the set of images is kept.

It is also possible to use recursive calculations, meaning only storing, for each new image, a single measurement $\mu(I)$ which incorporates the previous images. This avoids having to store a value $\mu(I)$ for each of the images I. By having the measurement $\mu(I)$ depend on the previous images, this also avoids the oscillation or flickering phenomena which can appear when successive images are processed independently of each other.

As non-limiting measurement examples, $\mu(I)$ can be a ratio between the green channel (G) and the red channel (R) of the image I, defined at any point where R is not zero, or, in practice, is greater than a threshold given by the noise level of the signal.

A sharpness measurement $\mu(I)$ can also be calculated, for example the Laplacian of a channel, solely at the points where the gradient is greater than a given value.

Other examples of measurement $\mu(I)$ can also be considered, according to the defect or defects presented by the image-capturing system 1.

Next, an estimated magnitude v of the considered defect or defects of the image-capturing system 1 is obtained, for example by calculation, which is dependent on the calculated measurement $\mu(I)$ (step 12). This magnitude v is obtained in a portion of the field of the image I which can be the same as the portion where the measurement $\mu(I)$ was calculated. Alternatively, this portion of the field of the image I can be different from the portion where the measurement $\mu(I)$ was calculated. In this case, an overlap between the two portions is possible. For example, the portion of the field where the magnitude v is obtained can be a sub-section of the portion where the measurement $\mu(I)$ was calculated. As a variant, it can itself contain the portion where the measurement $\mu(I)$ was calculated. For example, the magnitude v can be obtained for the entire field of the image I, with the measurement $\mu(I)$ calculated only at some locations within this field.

The obtained magnitude v is such that it has a variation of the same order of magnitude as the variation within the field of the characteristic of the image I produced by the considered defect of the image-capturing system 1.

This being so, the contribution of the scene S to the variations in the measurement μ(I) are eliminated, and only the variations resulting from the considered defect of the image-capturing system 1 are retained.

The magnitude ν can assume different forms. It can, for example, consist of a function able to return a value at each point of the image I where it is defined. As an example, this function can be a polynomial that is a function of the position of the field, or any other function for which the variations are compatible with those introduced into the image by the considered defect.

As a variant, the magnitude ν can consist of a set of parameters. Advantageously, given the properties of the defect of the image-capturing system 1, this number of parameters can be low.

As an example, the set of parameters can comprise the coefficients of a polynomial of degree 3 or 4. In another example, the set of parameters can comprise a set of values each relating to a point or a group of points in the image I, such as the values assumed by a function at these points or groups of points. In another example, the magnitude ν can consist of weighting for different maps of predetermined values, with the weight related to a point or a group of points of the image I. In yet another example, the magnitude ν can consist of a locally selected parameter between different functions. Other examples can also be considered, as will be apparent to a person skilled in the art.

The magnitude ν can be obtained by any appropriate method. Two possible methods are provided below as non-limiting examples.

The first method makes use of segmentation of the image I, followed by regularization.

This method is based on the fact that any given image I is likely to contain relatively stable areas where the represented scene varies relatively little. It is also based on the assumption that, within these uniform areas, the variations observed are essentially due to the considered defect of the image-capturing system 1.

In this method one therefore looks for such uniform areas. For this purpose, in at least a portion of the field of the image I, a set of homogeneous zones are identified, each of these homogeneous zones being defined as a region of the image I within which the calculated measurement μ(I) has a variation of the same order of magnitude as the variation within the field of the characteristic of the image I produced by the considered defect of the image-capturing system 1.

Figure 3:
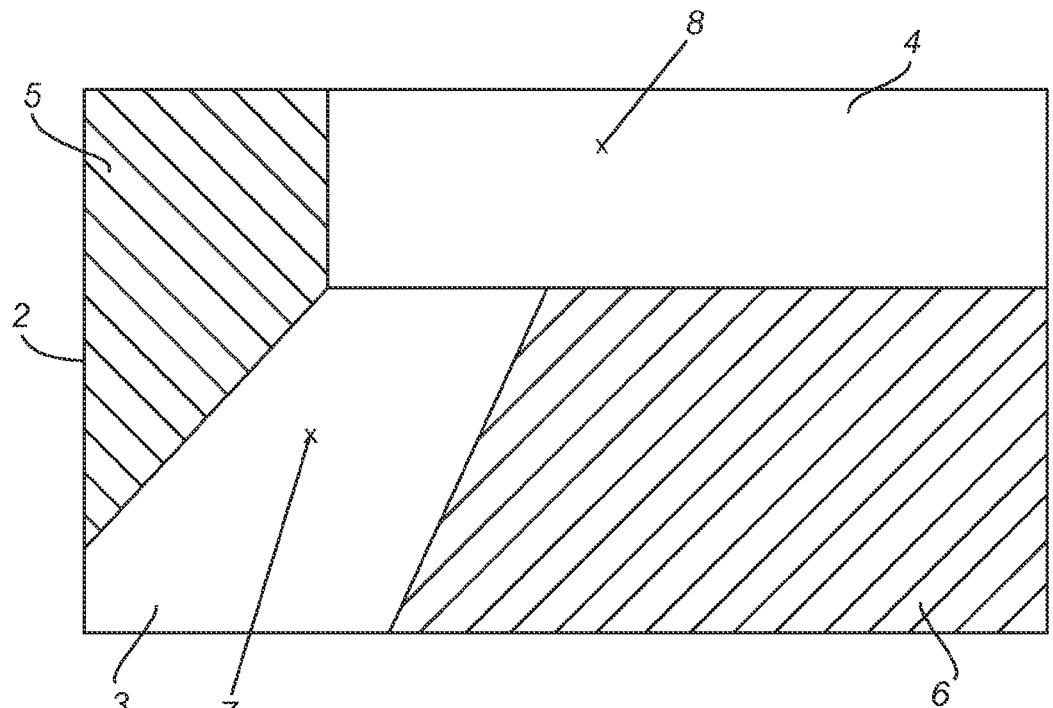
FIG. 3 is a diagram showing an image segmentation which can be implemented according to an embodiment of the invention.

To illustrate this principle, let us refer to FIG. 3 which shows an image 2 composed essentially of four regions 3-6. Of these regions, only regions 3 and 4 correspond to homogeneous zones. For example, region 3 represents a homogeneous object such as a table that is uniform in color, and region 4 represents another homogeneous object such as a wall that is uniform in color. The hatched regions 5 and 6 each correspond to a plurality of non-uniform objects and/or objects difficult to separate from each other.

The homogeneous zones in the image I can be identified, for example, by observing the measurement μ(I) calculated at different points in the field, and detecting the regions where this measurement varies with the same order of magnitude as the variation within the field of the characteristic of the image I produced by the considered defect of the image-capturing system 1.

For example, the homogeneous zones detected are the regions of the image I where the measurement μ(I) varies slowly within the field (faster variations in the measurement μ(I) are probably due to the scene S itself). In other words, two positions close to a homogeneous zone have values that are close. Note, however, that a homogeneous zone can comprise two points having widely differing values μ, provided that a path exists from one point to the other in which the variations in μ(I) are slow.

In addition, this segmentation of the image I, meaning the identification of a set of homogeneous zones within the image I, can advantageously be done such that each point in the image I belongs to one and only one region. This is what is illustrated in FIG. 3, where regions 3-6 do not overlap. These regions form a partitioning of the image.

As an example, the segmentation can be done by merging regions, with each point in the considered portion of the image I initially being a region. Regions which contain two neighboring points x1 and x2 are merged if the calculated measurement μ(I) is similar at these two points, meaning if the difference μ(x1)−μ(x2) is fairly small (for example less than a threshold value).

This is only an illustrative example. Any type of segmentation can be used, for example a Split and Merge algorithm as described by Horowitz and Pavlidis, or techniques such as Mumford-Shah which take contour regularity into account.

The output from the segmentation algorithm comprises a list of homogeneous zones $Z_i$. Each point of the object advantageously belongs to at most one homogeneous zone.

Next, regularization is applied in order to obtain the magnitude ν.

The magnitude ν is determined as an approximation of the variations in the measurement μ(I) using a regular function, varying only over large scales. In particular, in each homogeneous zone $Z_i$ determined by the segmentation, the approximation ν advantageously only contains low frequencies and is close to the low frequencies of μ(I).

Outside the homogeneous zones, it is assumed that the magnitude ν satisfies a regularity criterion. This assumption arises from the fact that most of the defects of image-capturing systems produce regular effects in the captured images.

In this example, the determination of the approximation ν is therefore based on two principles:
i/ the variations in ν and the variations in μ(I) are locally close within the homogeneous zones; and
ii/ the function ν is regular everywhere (unlike μ(I) which may have discontinuities at the edges of homogeneous zones and at points which do not belong to any homogeneous zone, in particular because of variations due to the scene S).

One means of forcing regularity in the function ν is to describe it for a family of regular functions, such as polynomials of low degree that are functions of the position in the field or sines and cosines of low frequency that are functions of the position in the field.

The optimal solution establishes a compromise between the above two principles.

To impose principle i/, one can for example choose a reference position $x_i$ in each homogeneous zone $Z_i$. This point of reference, denoted 7 for zone 3 and 8 for zone 4 in the example in FIG. 3, can be any point. It can, for example, be a point defined by its value μ($x_i$), which is for example the mean or median value in the zone $Z_i$. It can also be a point defined by its position, which is for example at the center of the zone $Z_i$.

The magnitude ν at any point x in the homogeneous zone $Z_i$ (denoted ν(x)) can thus be obtained by relating the measurement μ(I) calculated at this point (denoted μ(x)) to the measurement μ(I) calculated at the reference point (denoted μ($x_i$)).

In other words, principle i/ can be guaranteed for any point x in the homogeneous zone Zi by calculating $\mu(x)$ such that:

$$\frac{\mu(x)}{\mu(xi)} \approx \frac{v(x)}{v(xi)}.$$

One can, for example, penalize the differences $v(xi)\mu(x)-\mu(xi)v(x)$.

Another possibility which would eliminate the need for reference values is to penalize $\nabla(\ln \mu)-\nabla(\ln v)$, where $\nabla$ denotes the gradient operator.

The optimality criterion advantageously takes into account all available measurements, possibly attributing different weights according to the positions.

To impose principle ii/, one can, for example, penalize the variations in v. To do so, one can penalize the gradient or the Laplacian of v or any other operator describing the local variations of v.

The optimality criterion advantageously takes into account all positions in the field, possibly attributing different weights according to the positions.

Other global constraints can also be imposed on the optimal solution, for example the total amplitude cannot exceed a given fraction of the mean.

One might think that the measurement v(I) would be constant within the homogeneous zones of the image I. However, variations are generally observed because the measurements are subject to noise. Due to the imposed regularity constraints, the magnitude v is less subject to noise. It can be used to estimate these undesirable variations. For the same reasons, an image correction using the magnitude v can also result in a reduction in image noise.

In the second method, the magnitude v is obtained without needing two distinct and successive phases of segmentation and regularization.

To do this, one starts for example with a model of variations in the measurement $\mu(I)$. For example, this model can be provided as a parameter or by a number of learned maps.

A number of reference points in the image I are used. Then it is attempted to minimize the sum of the errors between the measurement $\mu(I)$ at each point in its domain and at a reference point. The optimization variables are the reference points (including their number) as well as the regularization map. In the case of maps learned beforehand, this can for example look for the map which minimizes the error or the combination of maps which minimizes the error.

The number of reference points can be the object of a penalization, and one can also look for the optimum position of a given number of reference points and the best associated map.

The obtained magnitude v can be used for different purposes. For example, it can be used for the qualification of the image-capturing system 1, based on the estimation it provides of the defect in the image-capturing system 1. It can also be used to select some image-capturing systems from among a plurality of such systems, and only retain those which have a slight defect.

As illustrated in FIG. 2, the obtained magnitude v can advantageously be used to determine at least one parameter c for correcting the considered defect of the image-capturing system 1, for a second image I' which may be the same as the image I or may be different from the image I (step 13). This or these correction parameters c allow determining a correction to be made to all or part of the image I' in order to eliminate or at least attenuate the effect of the defect.

In some cases, the magnitude v gives the correction parameter or parameters c directly. In other cases, the determination of these correction parameters c results from a calculation (other than the identity function) made using the magnitude v.

The correction parameter or parameters c can be diverse in nature. They can be parameters describing a correction algorithm or function, such as the coefficients of a polynomial which is a function of the position in the field of degree 3 or 4 for example. In another example, it can be a set of values each relating to a point or a group of points of the image I', such as the values assumed by a function at these points or groups of points. It can also be a weighting between different maps of predetermined values, with the weights relating to a point or a group of points of the image. Other examples can also be considered, as will be apparent to a person skilled in the art.

To obtain correction parameters c which are valid at each point of the image I', while the magnitude v has only been obtained for some points of the image I, an interpolation of the magnitude v can be done for the other points.

The two images I and I' are considered to be different, particularly when they represent different scenes. In this case, the determined correction parameters c will be adapted to the image I' although derived from the magnitude v obtained from the image I, if the variation in the characteristic produced by the considered defect of the image-capturing system 1 is independent of the scene. It is therefore advantageous for this type of defect if such correction parameters c are determined for an image I' representing a scene different from the image I.

By proceeding in this manner, it is possible to correct a defect in the image-capturing system which produces a variation, in a characteristic of the captured image, that is independent of the scene. This correction can then be used to correct any image captured by the image-capturing system 1. In this manner, an estimation done on a single image I can enable the correction of an entire series of images I' captured later on.

This avoids the need for calibration of the image-capturing system as mentioned in the introduction, since the image correction is made on the basis of an estimation done during the use of the image-capturing system.

The images I and I' are also considered to be different when the two images represent the same scene S at different resolutions. When the resolution of the image I' is higher than that of the image I, the correction advantageously includes an interpolation of the magnitude v to adapt to the higher resolution of the image I'.

The images I and I' are also considered to be different when they are captured under different image capture conditions and/or with different image capture parameters.

For example, the image I can be captured by the image-capturing system 1 just before the image I'. It can, for example, be a preview image for determining some capture parameters or for making some adjustments (such as obtaining sharpness measurements for some positions resulting from a variation in the relative distance between the optical system L and the sensor C due to the autofocus system AF).

The image I in which correction parameters are determined may possibly be simpler than the image I' to be corrected. For example, it may have a lower resolution, number of channels, and/or number of dimensions than the image I'. The lower resolution of the image I can be obtained by sub-sampling a large image of the same size as the image I', for example by determining zones in the large image and selecting at least one pixel from each zone or by averaging the pixels of each zone, the zones may be obtained by subdividing the large image into a regular or irregular grid the zones may be dependent on or independent of the content of the image.

This reduces the complexity of the calculations required, and in addition can eliminate the need to store the image I.

When the defect presented by the image-capturing system 1 produces a variation within the field of an image characteristic which is dependent on at least one image capture condition and/or at least one image capture parameter, the determined correction parameters c can thus advantageously be applied to an image I', which may be different from the image I but is captured by the image-capturing system with said image capture condition and/or parameter being identical or similar to the image I.

An image capture condition and/or image capture parameter for the image I' is considered to be identical or similar to the same image capture condition and/or image capture parameter for the image I, if its variation between the two images has an effect on the image characteristic modified by the considered defect that is insignificant or is tolerable to the human eye. The extent of the variation that is acceptable can therefore be different if considering two distinct defects. Thus the limits for the acceptable variation can be set for said image capture condition and/or image capture parameter according to the defect being considered.

For example, colored vignetting depends on the spectrum of the light illuminating the sensor. It also depends on the light source illuminating the scene. If the light source illuminating the scene has not changed between the two images, the colored vignetting will generally have similar values in the two images. The estimate for the first image can then be used for proper correction of the second image.

If the light source changes between the two images, the colored vignetting may change between the two images, but in this case the white balance will also change. In the case of an image-capturing system with real time image processing, at least one image will be necessary for estimating the colored vignetting of the invention, as is the case for white balancing.

In one variant, a complete or partial history is saved for one or more images I:

the image capture conditions and/or an image capture parameter, as well as the corresponding measurement $\mu(I)$ or magnitude v or correction parameter c.

During the image capture, the history can be used to avoid repeating calculations and to reduce the consumption of electricity and accelerate the adaptation of the correction to a change in image capture conditions and/or an image capture parameter when the processing is done on the fly without storing the image I.

When the first image is saved before its processing by the image-capturing system, preferably the first image and the second image are combined in order to obtain a correction appropriate for all cases.

Thus one can determine correction parameters for a phenomenon which varies with one or more image capture conditions and or parameters and which could not be corrected using the calibration of the prior art.

Advantageously, the determined correction parameter or parameters c can be used to correct the image I'.

The determination of the correction parameters c and/or the correction of the defect on the basis of these parameters can be implemented in the same system as the one which calculates the measurement $\mu(I)$ and obtains the estimated magnitude v of the defect, for example the image-capturing system 1 itself. This system then comprises, in addition to the units used to implement the steps described above, a unit for determining the correction parameter or parameters c for said defect, from the magnitude v obtained, for the image I' captured by the image-capturing system, and/or a processing unit appropriate for applying the correction on the basis of these parameters.

As a variant, the determination of the correction parameters c and/or the correction of the image I' which takes into account these parameters can be done by a separate system, which comprises a unit for determining correction parameters and/or a processing unit appropriate for applying the correction to the image I'.

Thus one can have a system for estimating the defect (which can be the image-capturing system itself), and a possibly separate system for determining the correction parameter or parameters for the considered defect. The correction of the image I' on the basis of the correction parameters c can be done by the system which determines the correction parameters, or by a separate correction system. In the latter case, the correction system advantageously comprises a unit for receiving the correction parameters c from the system which determines these parameters.

One will note that the systems mentioned in the present document can consist of simple devices, or of complex systems incorporating a plurality of distinct units each being responsible for one of the functions described above.

In addition, the different steps described above can be carried out wholly or in part by software, meaning by a computer program product comprising code instructions for this purpose. Additionally or alternatively, at least some of these steps can be carried out by an electronic circuit.

Figure 4:
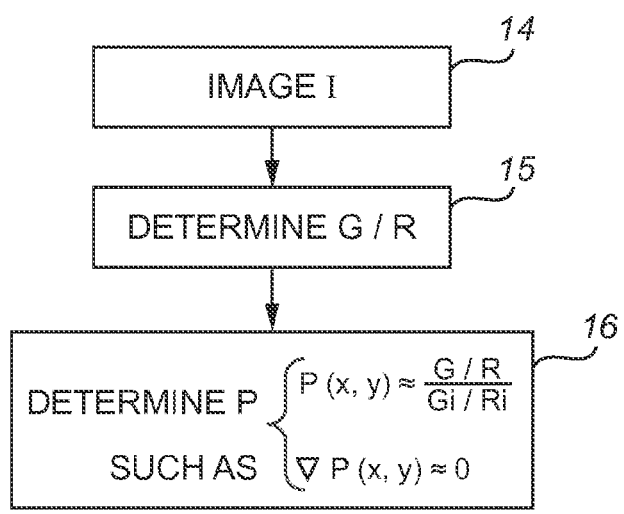
FIG. 4 is a flowchart showing a sequence of steps in an example in which the invention is used to estimate the colored vignetting defect.
Figure 5:
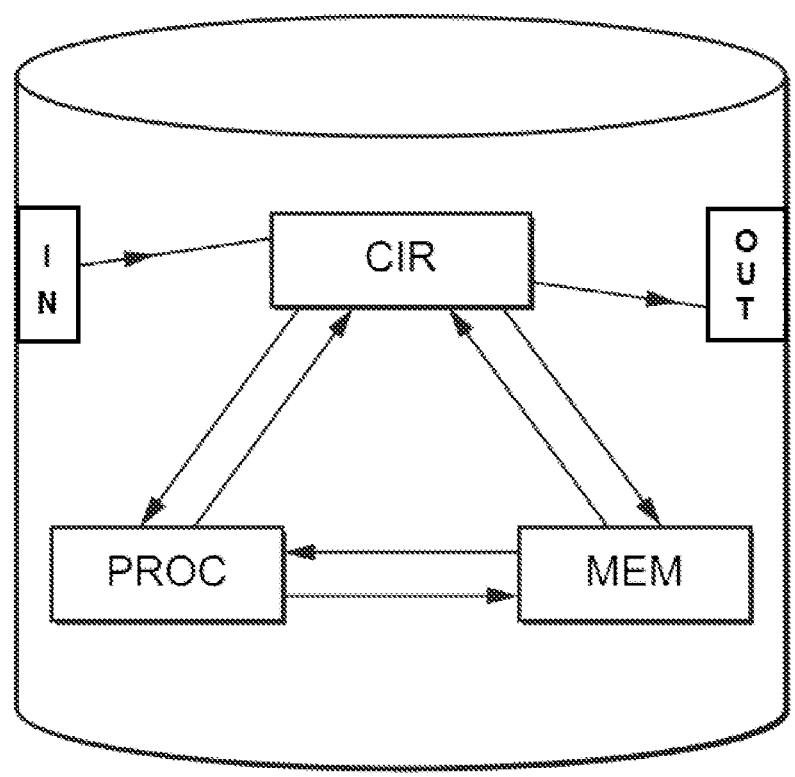
FIG. 5 is a system which can be implemented according to an embodiment of the invention.

An example of the above-mentioned system for carrying steps of the invention is illustrated in FIG. 5. This system comprises a combination of:

hardware elements typically comprising one or more electronic circuit CIR cooperating with a working memory MEM and a processor PROC, and receiving data from an input interface IN and outputting data to an output interface OUT, and software elements implementing algorithms illustrated by FIGS. 2 and 4.

Some exemplary applications of the present invention will be described below. These are not limiting examples; other applications can be envisaged, as will be apparent to a person skilled in the art.

In a first application, illustrated in FIG. 4, it is assumed that the image-capturing system 1 has the colored vignetting defect. As explained above, this defect produces, in a captured image I (step 14) which has a red channel R, a green channel G, and a blue channel B, a colorimetry variation in the field of the image I. As colored vignetting is a phenomenon which is dependent on the angle of incidence of the light received on the sensor, the resulting colorimetry variation is statistically an order of magnitude lower than the colorimetry variation resulting from the scene S.

In at least a first portion of the field of the image I, a measurement $\mu(I)$ is calculated concerning at least one color. This can be a ratio of colors across several channels. For example, this measurement comprises the G/R ratio of the light intensities measured in the green and red channel, as indicated in FIG. 4 (step 15). This measurement can be replaced or supplemented with the G/B ratio for example.

Next, in at least one second portion of the field of the image I (which can be different from or the same as said first portion), an estimated magnitude v for the colored vignetting defect is obtained. This is obtained such that this magnitude v depends on the calculated measurement $\mu(I)$ and has a variation of the same order of magnitude as the color variation resulting from the colored vignetting.

To do this, the image I can be segmented as described above for example, in order to determine the homogeneous zones Zi where the variation in G/R (and/or G/B) is slow. Within a homogeneous zone Zi, neighboring points of the image I having similar values of G/R (and/or G/B) can thus be grouped, for example those with values differing by less than a predetermined threshold.

To model the colored vignetting and guarantee the above properties i/and ii/, one can, for example, look for a function with slow variations to serve as the magnitude v, such as a polynomial P(x,y) of degree 3 or 4 for example, such that for any point having coordinates (x,y):

$$P(x, y) \approx \frac{G/R}{Gi/Ri} \left(\text{and/or } P(x, y) \approx \frac{G/B}{Gi/Bi}\right)$$

inside the homogeneous zone Zi
and $\nabla P(x,y) \approx 0$ outside the homogeneous zones,
where G, R and B represent the intensities measured at point (x,y) in the green, red and blue channels respectively, where Gi, Ri, and Bi represent the intensities measured at a reference point in the zone Zi in the green, red and blue channels respectively, and where $\nabla$ indicates the gradient operator (step 16).

To solve this problem and obtain the polynomial P(x,y) which satisfies the above conditions, one can, for example, arrive at the quadratic and linear problem of minimizing the following quantities:

$$\left|P(x, y) - \frac{G/R}{Gi/Ri}\right|^2 \left(\text{and/or } \left|P(x, y) - \frac{G/B}{Gi/Bi}\right|^2\right)$$

inside the homogeneous zone Zi
and $|\nabla P(x,y)|^2$ outside the homogeneous zones.

In this example, the obtained polynomial P(x,y) directly gives the correction parameters for colored vignetting (for example the polynomial itself, the coefficients of this polynomial, or other), for at least one image I', which can be different from or the same as the image I. Such a polynomial P(x,y) is defined in the entire field of the image I'.

The correction based on these correction parameters can, for example, be done as follows. For any point of coordinates (x,y) in the image I', the channel G is left unchanged and the value in the R (and/or B) channel is modified, with the corrected value R' (and/or B') being such that R'=P(x,y).R (and/or B'=P(x,y).B).

In effect, because P(x,y) was determined such that $$\left|P(x, y) \approx \frac{G/R}{Gi/Ri}\right| \left(\text{and/or } \left|P(x, y) \approx \frac{G/B}{Gi/Bi}\right|\right)$$

in the homogeneous zone Zi, the ratio G/R' (and/or G/B') for a point in this zone Zi is substantially equal to Gi/Ri (and/or Gi/Bi). In other words, inside each homogeneous zone, the colors were modified to correspond substantially to those of the chosen reference point in said zone. The colorimetry variation related to colored vignetting is therefore more or less eliminated in each homogeneous zone.

The effect of colored vignetting is also limited outside the homogeneous zones, because the polynomial P(x,y) for expressing the slow variations within the entire image I ($\nabla P(x,y) \approx 0$) has been determined.

It is understood that this is only one example of estimating and correcting colored vignetting. Alternatively, the estimating and correcting of this defect could be determined without having to explicitly define homogeneous zones in the image I.

One will also note that the correction of colored vignetting by applying a gain to one or more channels is not the only correction model. For example, a more general correction would be to apply a matrix in which the coefficients depend on the position in the field and which combines the different channels in a manner that is dependent on the position in the field. The previous correction corresponds to the specific case of a diagonal matrix. One can easily generalize it to models of an arbitrary higher order.

The example just described for colored vignetting can easily be transposed to estimating the defect of luminance vignetting, in which the captured image is darker at the edge than at the center.

To do this, rather than using a ratio of values in different color channels (G/R and/or G/B) as the measurement µ(I), a light intensity value for one or more channels (for example, G or R or B) is considered. Otherwise the determination of a polynomial P(x,y) in a similar manner to what has just been described is equally well-suited to this case.

In another example, a blur variation in the field of the image I is estimated, for example due to the curvature of field and/or to the longitudinal chromatic aberration introduced by the image-capturing system 1.

In at least a first portion of the field of the image I, a measurement µ(I) concerning at least one blur level is calculated.

Then, in at least one second portion of the field of the image I (which can be the same as or at least partially different from said first portion), an estimated magnitude v of the blur variation is obtained. This magnitude v depends on the calculated measurement µ(I) and has a variation of the same order of magnitude as the variation resulting from the blur variation. To do this, one can apply local enhancement filters to bring the level of blur to a given value.

As an example, a level of blur can be calculated at each point x of the image I and for each of the red R and green G channels. These levels of blur are denoted $F_R(x)$ and $F_G(x)$. Then, for an edge of an object in the scene S, identified in the image I using a conventional edge detection algorithm, the relative blur between the channels R and G, for example the ratio $F_R(x)/F_G(x)$, is constant overall. For this purpose, a function with slow variations can be determined for the magnitude v, such as a polynomial P(x) which approximates a constant ratio $F_R(x)/F_G(x)$. Aside from the identified edge, the gradient of P(x) can be minimized for example to ensure the regularity of the polynomial within the field.

As will be apparent to a person skilled in the art, other defects of the image-capturing system can be estimated, possibly for the purposes of correction, according to the principles of the invention. Some non-limiting examples are provided below.

To limit the differences in green level between the pixels Gr and Gb of a Bayer array, the ratio Gr/Gb can be calculated as the measurement µ(I), thus obtaining a magnitude v describing the crosstalk variations.

Another defect is optical flare, which is glare on the sensor when a powerful light source is close to the field or is in the field. Flare is due to stray reflections within the optical system. The effect produces a veil of light over the image which reduces the contrast and dulls the colors. Often it also induces a difference between Gr and Gb. The difference between Gr and Gb allows detecting and measuring flare variations and adapting the color rendering and the contrast to the scene. The characteristic measurement can therefore be the difference between Gr and Gb which is dependent on the image capture conditions. The magnitude can be a shift of the black point which is dependent on the image capture conditions and the position in the field.

In another example, in order to estimate astigmatism, a measurement μ(I) of the orientation of a blur spot can be calculated.

Another example concerns the estimation of geometric distortion. This defect of an image-capturing system is such that the straight lines of a photographed scene do not appear straight in the captured image. To estimate this defect, one can, for example, locate the regular edges in the captured image I. Then a measurement μ(I) of local curvature at the located edges can be calculated, and a magnitude v obtained corresponding to a map of the variation in magnification across the field.

Another example concerns lateral chromatic aberration. This defect of the image-capturing system introduces a magnification which is dependent on the wavelength. To estimate this defect, one can, for example, locate the regular edges in the captured image I. Then a measurement μ(I) of a difference in position of these edges can be calculated for different wavelengths or wavelength ranges (for example in the different channels R,G,B), and a magnitude v obtained which corresponds to a map of the differences in position between these wavelengths or wavelength ranges. This difference in position can only be evaluated locally in the direction orthogonal to the edge. Note that when the lateral chromatic aberration causes a magnification in a radial direction, it is only possible to calculate the measurement μ(I) using edges that do not pass through the center of the captured image I. If all the edges pass through the center of the image, the lateral chromatic aberration cannot be corrected, but the aberration has no effect on the image, which renders the correction unnecessary. In a more practical and general case, the image will contain a plurality of edges in a plurality of directions. By using the fact that chromatic aberration is a phenomenon which varies slowly within the field, the map of displacements v can be estimated everywhere and in all directions.

Another example concerns non-uniform black level. This defect causes an image-capturing system that has received a given amount of light to return a response which is not completely linear. In particular, even in the complete absence of light, the returned value is not zero and depends on the position within the field. To estimate this defect, a measurement μ(I) corresponding to the response of the sensor can be calculated for the dark portions of the captured image I, and a magnitude v obtained which estimates the response of the sensor for the entire field.

Another example concerns non-uniform noise. This defect is related to the fact that an image-capturing system can comprise different parts which generate noise of variable intensity. To estimate this defect, a measurement μ(I) can be calculated of the local noise variance, and a magnitude v obtained by estimating local gains which stretch the local noise variance. It is then possible to correct an image I' for noise using the correction parameters deduced from the obtained magnitude v. The corrected image I' contains generally uniform noise.

The invention claimed is:

1. Method for estimating at least one defect of an image-capturing system, said defect producing, for any at least one first image captured by the image-capturing system and representing any scene, a variation within the field of at least one characteristic of the first image, said variation being statistically an order of magnitude lower than a variation within the field of said characteristic of the first image introduced by the scene, said method comprising the following steps:
   calculating, in at least a first portion of the field of the first image, a measurement relative to said characteristic of the first image; and
   obtaining, in at least a second portion of the field of the first image, an estimated magnitude of said defect, said magnitude being dependent on the calculated measurement and having a variation of the same order of magnitude as the variation within the field of said characteristic of the first image produced by said defect;
   determining, from the obtained magnitude, at least one correction parameter of said defect for at least one second image captured by the image-capturing system, said second image being different from the first image.

2. Method according to claim 1, wherein the second image is captured by the image-capturing system immediately after the first image.

3. Method according to claim 1, wherein the first image is a pre-capture or preview image.

4. Method according to claim 1, wherein said correction parameter is determined for the entire field of the second image.

5. Method according to claim 1, additionally comprising a processing of the second image, captured by the image-capturing system, which takes into account said correction parameter.

6. Method according to claim 1, wherein the first image has a lower resolution, number of channels, and/or number of dimensions than the second image.

7. Method according to claim 1, wherein said variation within the field of at least one characteristic of the first image produced by said defect is dependent on at least one image capture parameter and/or image capture condition of the first image, and wherein the second image is captured by the image-capturing system with said image capture parameter and/or image capture condition being identical or similar to the first image.

8. Method according to claim 1, wherein said variation within the field of at least one characteristic of the first image produced by said defect is specific to said image-capturing system.

9. Method according to claim 8, wherein said defect depends on at least one uncertainty in the manufacture of said image-capturing system.

10. Method according to claim 1, wherein said defect of the image-capturing system comprises at least one of the following: luminance vignetting, colored vignetting, non-uniform blur, non-uniform variation of a ratio between neighboring photosensitive elements in the same channel, non-uniform noise, geometric distortion, lateral chromatic aberration, longitudinal chromatic aberration, astigmatism, flare, and non-uniform black level.

11. Method according to claim 1, comprising an identification, in said at least first portion of the field of the first image, of a set of homogeneous zones within each of which said calculated measurement varies by the same order of magnitude as the variation within the field of said characteristic of the first image produced by said defect, and wherein said magnitude is obtained by taking into account the identified homogeneous zones.

12. Method according to claim 11, wherein said magnitude is obtained, inside a homogeneous zone of said set of homogeneous zones, by relating said calculated measurement to a measurement concerning said characteristic of the first image and calculated at a reference point of said homogeneous zone.

13. System for estimating at least one defect of an image-capturing system, said defect producing, for at least any one first image captured by the image-capturing system and representing any scene, a variation within the field of at least one characteristic of the first image, said variation being statistically an order of magnitude lower than a variation within the field of said characteristic of the first image introduced by the scene, said system comprising:
- a calculating device configured, in at least one first portion of the field of the first image, to calculate a measurement concerning said characteristic of the first image;
- an electronic circuit configured to obtain, in at least one second portion of the field of the first image, an estimated magnitude for said defect, said magnitude being dependent on the calculated measurement and having a variation of the same order of magnitude as the variation within the field of said characteristic of the first image produced by said defect;
- an electronic circuit configured to determine, from the obtained magnitude, at least one correction parameter of said defect for at least one second image captured by the image-capturing system, said second image being different from the first image.

14. A non-transitory computer readable storage medium, having stored thereon a computer program comprising program instructions, the computer program being loadable into a data-processing device and adapted to cause the data-processing device to carry out the steps of claim 1 when the computer program is run by the data-processing device.

15. System for estimating at least one defect of an image-capturing system, said defect producing, for at least any one first image captured by the image-capturing system and representing any scene, a variation within the field of at least one characteristic of the first image, said variation being statistically an order of magnitude lower than a variation within the field of said characteristic of the first image introduced by the scene, said system comprising a processing unit configured to:
- in at least one first portion of the field of the first image, calculate a measurement concerning said characteristic of the first image;
- obtain, in at least one second portion of the field of the first image, an estimated magnitude for said defect, said magnitude being dependent on the calculated measurement and having a variation of the same order of magnitude as the variation within the field of said characteristic of the first image produced by said defect;
- determine, from the obtained magnitude, at least one correction parameter of said defect for at least one second image captured by the image-capturing system, said second image being different from the first image.

* * * * *